US012794165B2

(12) United States Patent
Posmik et al.

(10) Patent No.: US 12,794,165 B2
(45) Date of Patent: Nov. 10, 2026

(54) SEALED CONNECTOR WITH SELF LOCKING TERMINAL POSITION ASSURANCE DEVICE

(71) Applicant: Aptiv Technologies AG, Schaffhausen (CH)

(72) Inventors: Mirko Posmik, Fürth (DE); Nithish Sukumar, Karur (IN)

(73) Assignee: Aptiv Technologies AG, Schaffhausen (CH)

( * ) Notice: Subject to any disclaimer, the term of this patent is extended or adjusted under 35 U.S.C. 154(b) by 385 days.

(21) Appl. No.: 18/670,958

(22) Filed: May 22, 2024

(65) Prior Publication Data

US 2024/0396248 A1 Nov. 28, 2024

(30) Foreign Application Priority Data

May 23, 2023 (EP) .................................... 23174972

(51) Int. Cl.
*H01R 13/436* (2006.01)
*H01R 13/502* (2006.01)
(Continued)

(52) U.S. Cl.
CPC ....... *H01R 13/4362* (2013.01); *H01R 13/502* (2013.01); *H01R 13/5219* (2013.01); *H01R 43/20* (2013.01); *H01R 13/506* (2013.01)

(58) Field of Classification Search
CPC ............ H01R 13/4362; H01R 13/5219; H01R 13/502; H01R 43/20
(Continued)

(56) References Cited

U.S. PATENT DOCUMENTS 4,936,798 A * 6/1990 Hass .................. H01R 13/4365 439/752
5,076,806 A * 12/1991 Hotea .................. H01R 13/506 439/752
(Continued)

FOREIGN PATENT DOCUMENTS

DE 102017115913 A1 1/2018
DE 102018124876 A1 4/2020
(Continued)

OTHER PUBLICATIONS

"Extended European Search Report" for EP Application No. 23174972.2-1201; European Patent Office; Oct. 25, 2023; 12 pages.

*Primary Examiner* — Marcus E Harcum
(74) *Attorney, Agent, or Firm* — Billion & Armitage

(57) ABSTRACT

An electrical connector is disclosed, including an inner housing with at least one cavity aligned parallel to an insertion direction, an outer housing with a mating face accommodating the inner housing, at least one terminal housed in each cavity, and a terminal position assurance device (TPA) positioned between the inner and outer housings. The TPA is fully covered by the outer housing and can be rotated about a perpendicular axis to the insertion direction. It transitions between an open position allowing terminal insertion and a closed position securing the terminals in the cavities. Actuating means on the outer housing facilitate TPA movement as the inner housing is inserted from an initial to a final position, ensuring proper terminal locking within the deepest functional position of the outer housing.

11 Claims, 6 Drawing Sheets

(51) Int. Cl.
*H01R 13/52* (2006.01)
*H01R 43/20* (2006.01)
*H01R 13/506* (2006.01)

(58) Field of Classification Search
USPC .......................................................... 439/752
See application file for complete search history.

(56) References Cited

U.S. PATENT DOCUMENTS

| | | | | |
|---|---|---|---|---|
| 6,247,966 | B1 * | 6/2001 | Klein | H01R 13/4223 439/752 |
| 6,270,376 | B1 * | 8/2001 | Fink | H01R 13/62977 439/752 |
| 6,402,573 | B1 * | 6/2002 | Yeomans | H01R 13/4362 439/752 |
| 7,044,808 | B1 * | 5/2006 | Foltz | H01R 13/4362 439/752 |
| 7,625,251 | B2 * | 12/2009 | Martin | H01R 13/4223 439/752 |
| 8,011,977 | B2 * | 9/2011 | Tsuruta | H01R 13/4365 439/752 |
| 10,079,446 | B1 * | 9/2018 | Sundarakrishnamachari | H01R 13/4362 |
| 10,566,728 | B1 * | 2/2020 | Sundarakrishnamachari | H01R 13/6278 |
| 2001/0029131 | A1 * | 10/2001 | Fischer | H01R 13/514 439/752 |
| 2002/0039863 | A1 * | 4/2002 | Morello | H01R 13/4361 439/752 |
| 2009/0186523 | A1 * | 7/2009 | Campbell | H01R 13/4365 29/428 |
| 2020/0274283 | A1 * | 8/2020 | Demaratos | H01R 13/436 |
| 2023/0246384 | A1 * | 8/2023 | Huynh | H01R 13/5219 439/157 |
| 2024/0079812 | A1 * | 3/2024 | Zhang | H01R 13/4223 |

FOREIGN PATENT DOCUMENTS

| | | | |
|---|---|---|---|
| DE | 102021118454 | B3 | 10/2022 |
| EP | 0424887 | A1 | 5/1991 |
| EP | 1189311 | A2 | 3/2002 |

* cited by examiner

SEALED CONNECTOR WITH SELF LOCKING TERMINAL POSITION ASSURANCE DEVICE

CROSS-REFERENCE TO RELATED APPLICATION

This application claims the benefit of and priority to European Patent Application No. 23174972.2 titled "Sealed Connector with Self Locking TPA" filed on May 23, 2023, the contents of which are incorporated by reference herein.

TECHNICAL FIELD

This disclosure generally relates to the field of automotive interconnections. More particularly, this disclosure relates to a sealed connector. For example, this disclosure relates to a sealed cable connector for high-speed signal transmission.

BACKGROUND

Previous approaches to electrical connectors have typically involved designs where terminals are inserted into fixed cavities within an inner housing, with the outer housing providing a protective and enclosing structure around the inner components. In these conventional designs, the terminals are often secured in place within the cavities using various locking mechanisms or retention features to prevent unintended disconnection during use. However, these fixed locking mechanisms can sometimes be cumbersome to operate and may require additional tools or manual manipulation to insert or remove the terminals from the connector.

Furthermore, existing electrical connectors may lack a user-friendly terminal position assurance device (TPA) that allows for easy insertion and removal of terminals while ensuring secure locking in place once inserted. Some connectors may utilize separate components for terminal retention and locking, leading to increased complexity and potential points of failure within the connector assembly. Additionally, the actuation mechanisms for transitioning the TPA between open and closed positions may not always be integrated seamlessly with the overall connector design, resulting in a less intuitive user experience.

In certain instances, electrical connectors may incorporate rotating mechanisms for terminal retention, but these designs may not fully address the need for a compact and efficient TPA system that can be smoothly operated during insertion and removal of terminals. The existing solutions may lack the ability to completely cover the TPA within the outer housing, leading to potential exposure of sensitive components to external elements. Moreover, the rotation axis of the TPA in previous designs may not align optimally with the insertion direction of the inner housing, potentially causing operational challenges during assembly and disassembly of the connector. However, none of these approaches have provided a comprehensive solution that combines the features described in this disclosure.

SUMMARY

In some aspects, the techniques described herein relate to an electrical connector, including an inner housing including at least one cavity extending parallel to an insertion direction, an outer housing including a mating face and being configured to accommodate the inner housing at least partially, at least one terminal, each terminal being accommodated in one of the at least one cavity, and a terminal position assurance device (TPA) configured to be mounted between the inner and outer housings, so that the TPA is completely covered by the outer housing, the TPA being configured to be rotatably moved about a rotation axis essentially perpendicular to the insertion direction, between at least an open position in which it allows the at least one terminal to be inserted in the at least one cavity and a closed position in which it locks the at least one terminal in the at least one cavity, the outer housing including actuating means configured to actuate the TPA between its open position and its closed position, when the inner housing is pushed into the outer housing between an initial position and a final position, in which the inner housing is inserted into the outer housing in its deepest functional position in the outer housing, in which the TPA is configured to be rotatably moved about the rotation axis between the open position and the closed position.

In some aspects, the techniques described herein relate to a method of assembling an electrical connector, including providing an inner housing, an outer housing, at least one terminal, and a TPA, the outer housing including actuating means configured to actuate the TPA between its open position and its closed position, when the inner housing is pushed into the outer housing between an initial position and a final position, positioning the TPA onto the inner housing, inserting in the outer housing, the inner housing with the TPA positioned onto it, up to the initial position where the TPA is in an open position in which it allows each one of the at least one terminal to be inserted in a respective cavity, inserting each one of the at least one terminal in the inner housing, up to a full insertion position, and pushing the inner housing from the initial position to the final position, in which the inner housing is inserted into the outer housing in its deepest functional position in the outer housing, in which the TPA is in a closed position and in which the TPA locks each one of the at least one terminal in its respective cavity, in which the TPA is mounted between the inner and outer housings, the TPA being completely covered by the outer housing, and in which the TPA is configured to be rotatably moved about a rotation axis essentially perpendicular to an insertion direction, between the open position and the closed position.

In some aspects, the techniques described herein relate to a method of removing a terminal from a connector having an inner housing including at least one cavity extending parallel to an insertion direction, an outer housing including a mating face and being configured to accommodate the inner housing at least partially, at least one terminal, each terminal being accommodated in one of the at least one cavity, and a TPA configured to be mounted between the inner and outer housings, so that the TPA is completely covered by the outer housing, the TPA being configured to be rotatably moved about a rotation axis essentially perpendicular to the insertion direction, between at least an open position in which it allows the at least one terminal to be inserted in the at least one cavity and a closed position in which it locks the at least one terminal in the at least one cavity, the outer housing including actuating means configured to actuate the TPA between its open position and its closed position, when the inner housing is pushed into the outer housing between an initial position and a final position, in which the inner housing is inserted into the outer housing in its deepest functional position in the outer housing, in which the TPA is configured to be rotatably moved about the rotation axis between the open position and the closed position, the method including actuating the TPA with a tool and pivoting the TPA from its closed position to its open position around the rotation axis, thereby releasing each terminal, whereas the inner housing is inserted into the outer housing in its deepest functional position in the outer housing.

BRIEF DESCRIPTION OF THE DRAWINGS

The present invention is now described, by way of example with reference to the accompanying drawings, in which.

DETAILED DESCRIPTION

Figure 1:
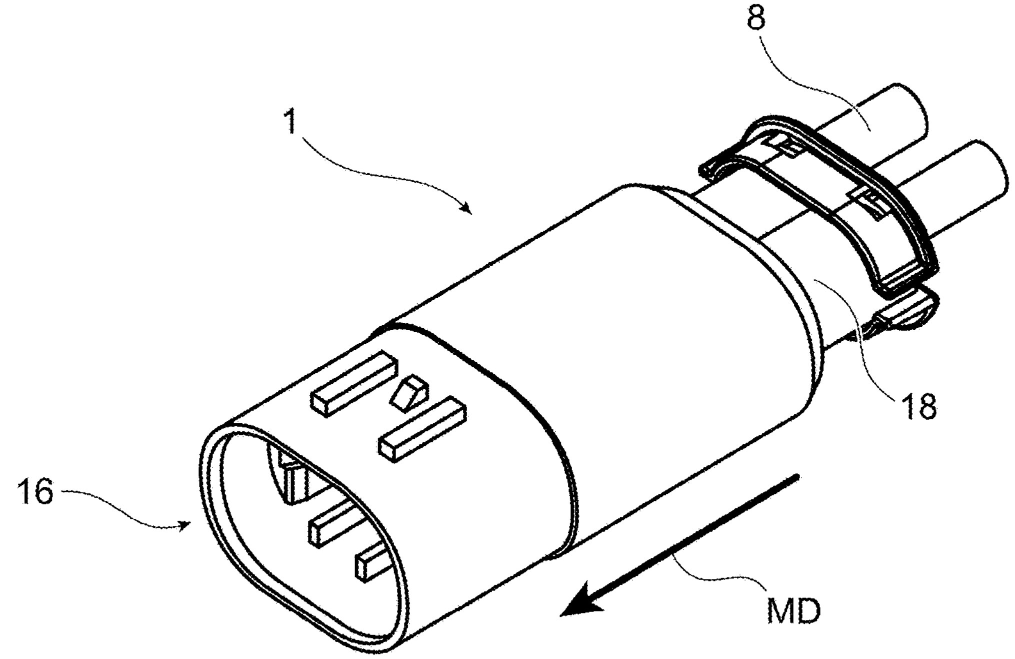
FIG. 1 is a schematic perspective view of a connector according to some embodiments.
Figure 12:
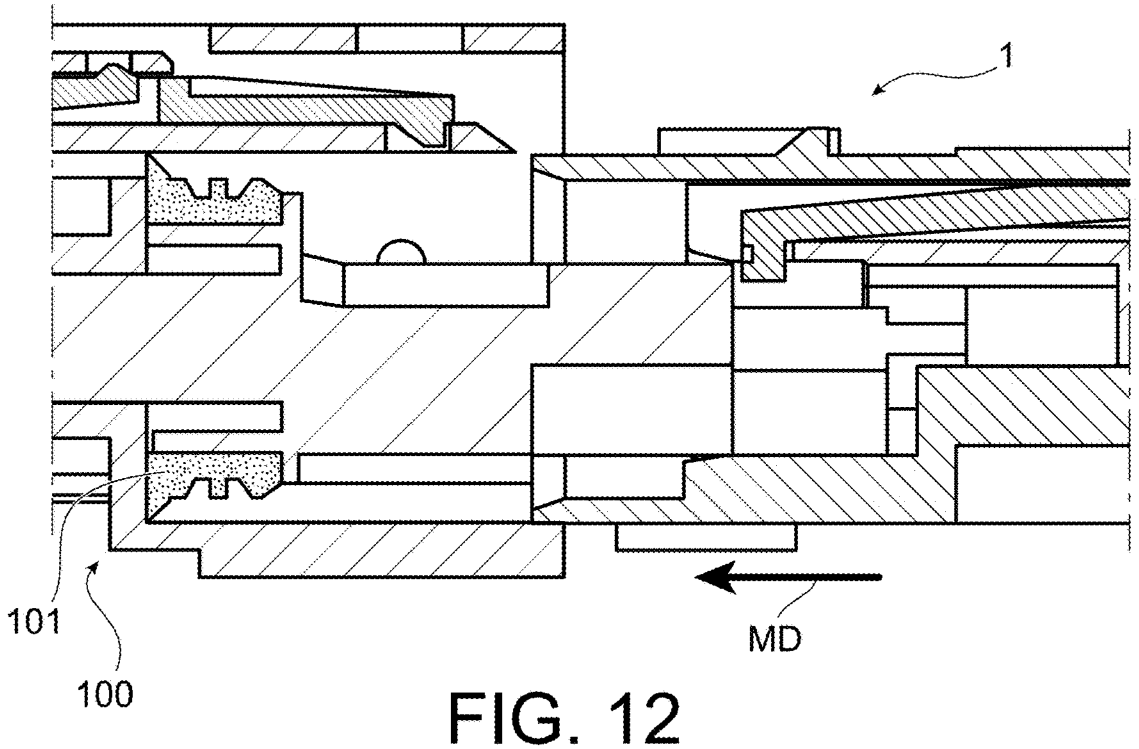
FIG. 12 is a partial schematic longitudinal and horizontal cross-sectional view of a connector assembly including the connector of FIGS. 1 and 2, and a counter-connector blocked by the TPA according to some embodiments.

FIG. 1 shows an embodiment example of an electrical sealed connector 1. This example of connector 1 is disclosed below. According to this example, the connector 1 is a H-MTD® connector ("H-MTD" stands for High-Speed Modular Twisted-Pair Data). More particularly, according to this example, the connector 1 is a two-way cable connector. In this example, it is a male connector. The connector 1 is configured and intended to be connected in a mating direction MD to a counter-connector 100 (in this example, a female connector which is partially shown in FIGS. 12 and 13).

Figure 2:
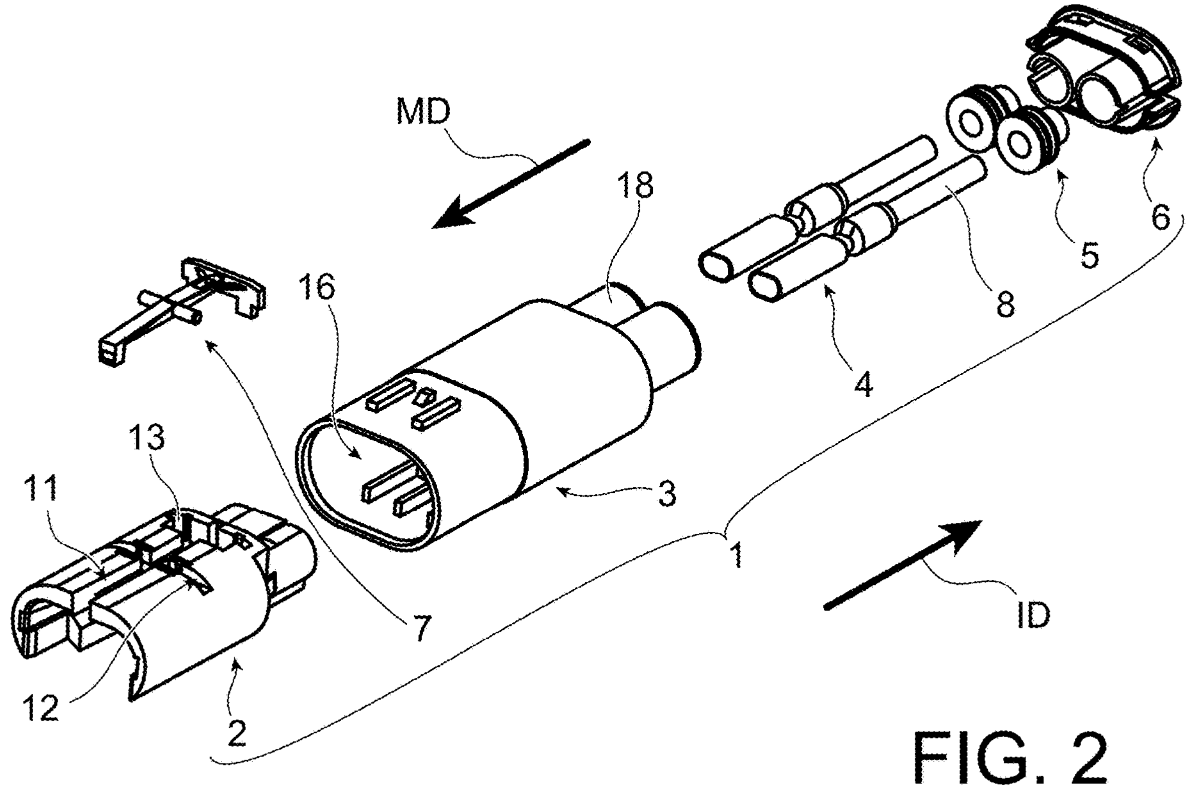
FIG. 2 is a schematic exploded view of the connector illustrated in FIG. 1 according to some embodiments.

FIG. 2 is an exploded view of the connector illustrated in FIG. 1. This electrical connector 1 includes an inner housing 2, an outer housing 3, a pair of male terminals 4, a pair of single-wire seals 5, a retainer 6 and a TPA 7. The male terminals 4 of H-MTD® connectors are particularly long. It is therefore difficult to use conventional TPA designs. Further, conventional TPAs are not much automation friendly. The TPA 7 disclosed here-below mitigates these drawbacks.

The inner housing 2, the outer housing 3, the retainer 6 and the TPA 7 are made of molded plastics. Each terminal 4 is crimped at the free end of a respective electrical cable 8. Each terminal 4 is made of an electrically conductive material.

The inner housing 2 includes two-cavities 9 extending parallel to an insertion direction ID (see FIGS. 6, 7, 9 and 11). In the illustrated example, the connector 1 is a straight connector and this insertion direction ID is parallel and opposite to a mating direction MD (See FIGS. 12 and 13). The mating direction MD is the direction in which the connector 1 is mated and connected to a counter-connector 100. Each terminal 4 is respectively accommodated in one of the two cavities 9.

Figure 4:
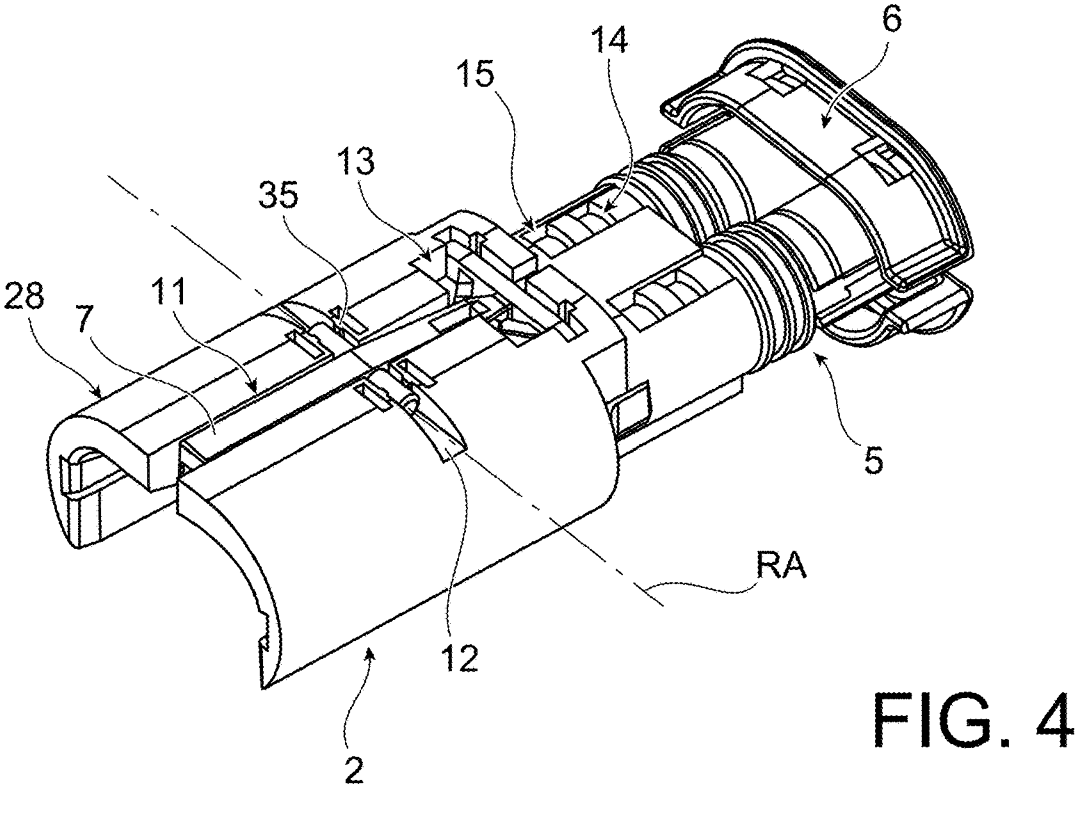
FIG. 4 is a schematic perspective view of the connector illustrated in FIGS. 1 and 2 without its outer housing, its cables, and its terminals according to some embodiments.
Figure 5:
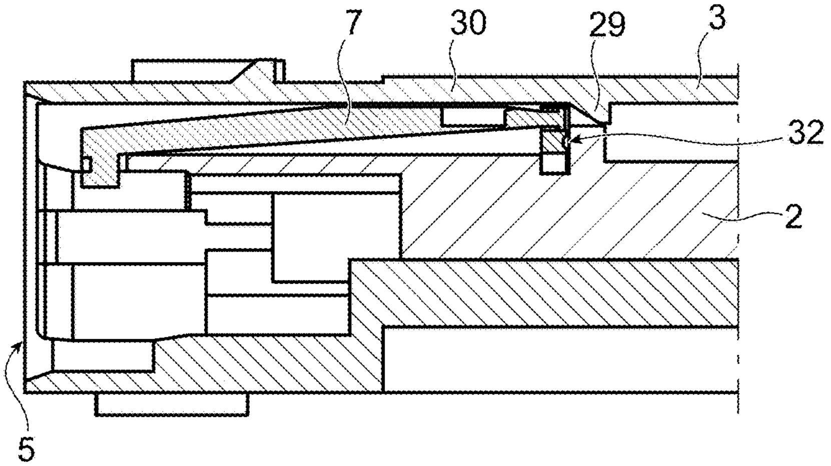
FIG. 5 is a schematic longitudinal and vertical cross-sectional view of the front portion of the outer housing, TPA and inner housing of the connector illustrated in FIGS. 1 and 2, the inner housing being partially inserted in the outer housing according to some embodiments.

The inner housing 2 includes an external face 10 within which a longitudinal channel 11, a transversal channel 12, an opening 13, a rear notch 14 and a front notch 15 are formed (See FIG. 4).

The outer housing 3 includes a mating face 16 (See FIGS. 1, 5, 8 to 11, 14 and 15). The outer housing 3 accommodates the inner housing 2. For example, the inner housing 2 is completely inserted in the outer housing 3 (See FIG. 1), when in a final position. For example, the inner housing 2 is inserted in the outer housing 3 from its mating face 16 (i.e. its front face). When the inner housing 2 is fully (completely) inserted in the outer housing 3, a front sealing portion 17, open on the mating face 16 of the outer housing 3, is cleared from the inner housing 2. In other words, the front sealing portion 17 is configured to form a sealing barrier with a counter-connector 100 mated to the connector 1 (see FIG. 13). The outer housing 3 has a rear sealing portion 18 configured to accommodate the single-wire seals 5. The rear sealing portion 18 is configured to form a sealing barrier with each cable 8. Therefore, when the inner housing 2 is accommodated in the outer housing 3, when the connector 1 is mated to a counter-connector 100 and when the cables 8 and the seals 5 are mounted in the connector 1, the connector 1 is sealed (in particular against water and dust). In other words, the outer housing 3 provides a closed enclosure between the front sealing portion 17 and the rear sealing portion 18.

Figure 6:
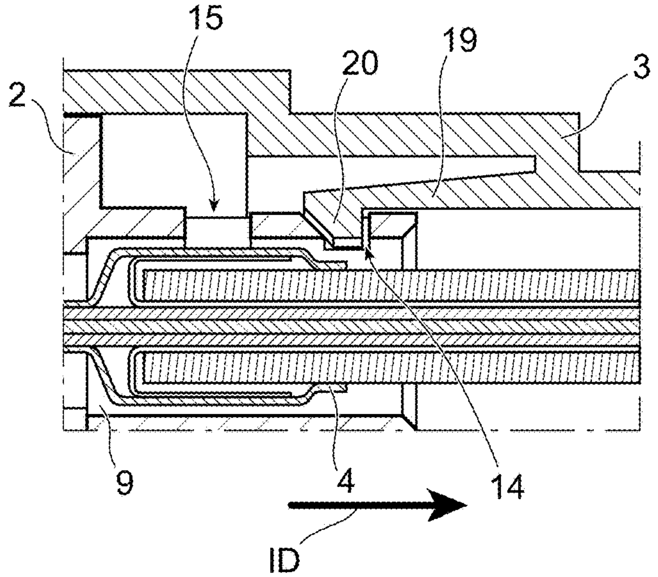
FIG. 6 is a schematic cross-sectional view similar to FIG. 5, of the rear portion of the connector of FIGS. 1 and 2, the inner housing being in pre-locked position in the outer housing according to some embodiments.
Figure 7:
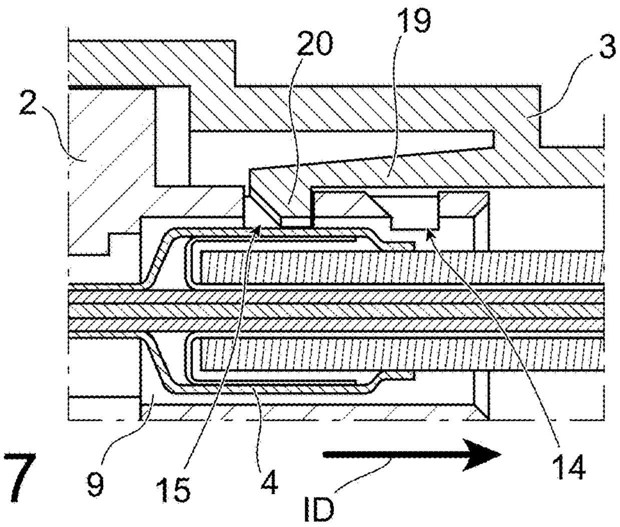
FIG. 7 is a view similar to FIG. 6, the inner housing being in locked position in the outer housing according to some embodiments.
Figure 8:
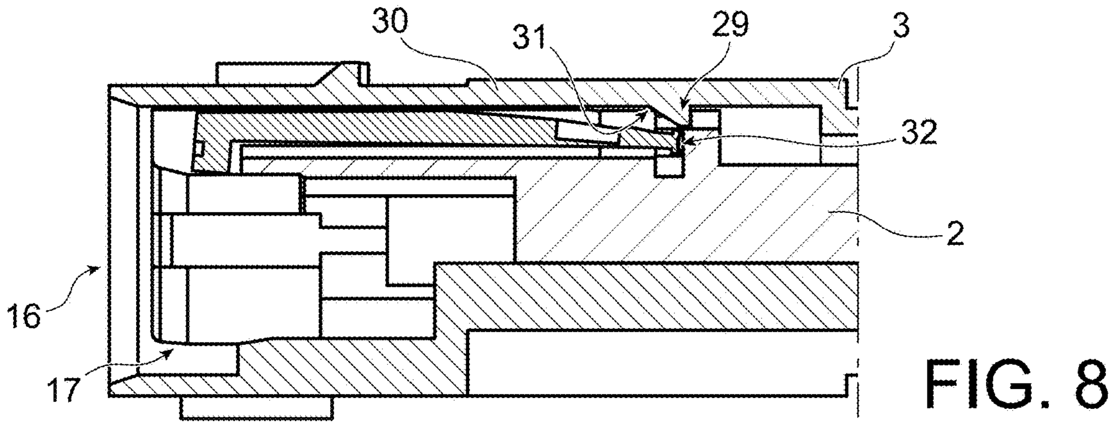
FIG. 8 is a view similar to FIG. 5, the inner housing being in an intermediate position, between the pre-locked position and the locked position according to some embodiments.
Figure 9:
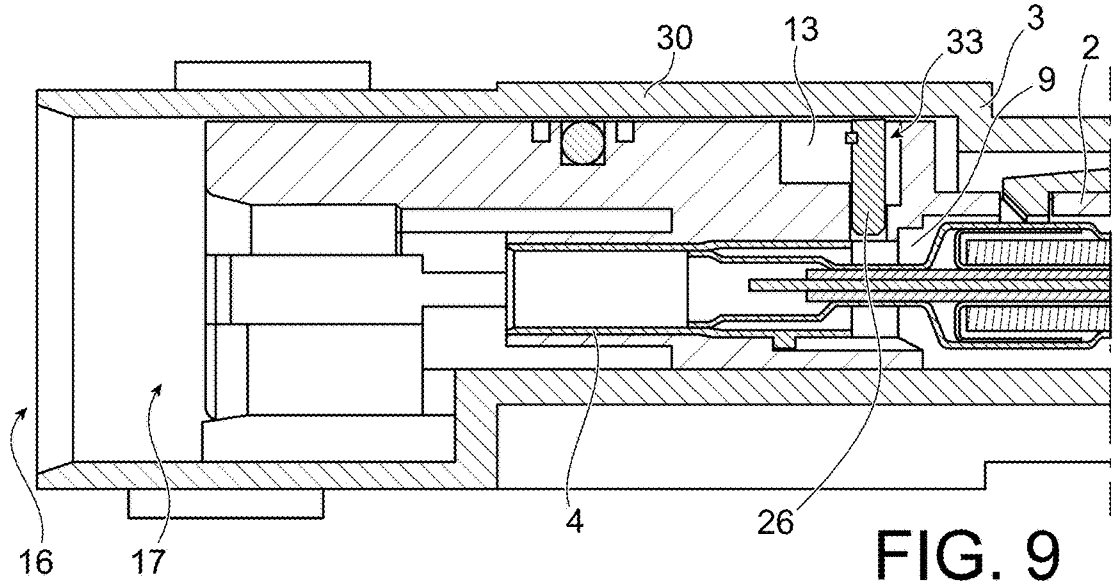
FIG. 9 is a view similar to FIG. 8, but in a different cross-section plan according to some embodiments.
Figure 10:
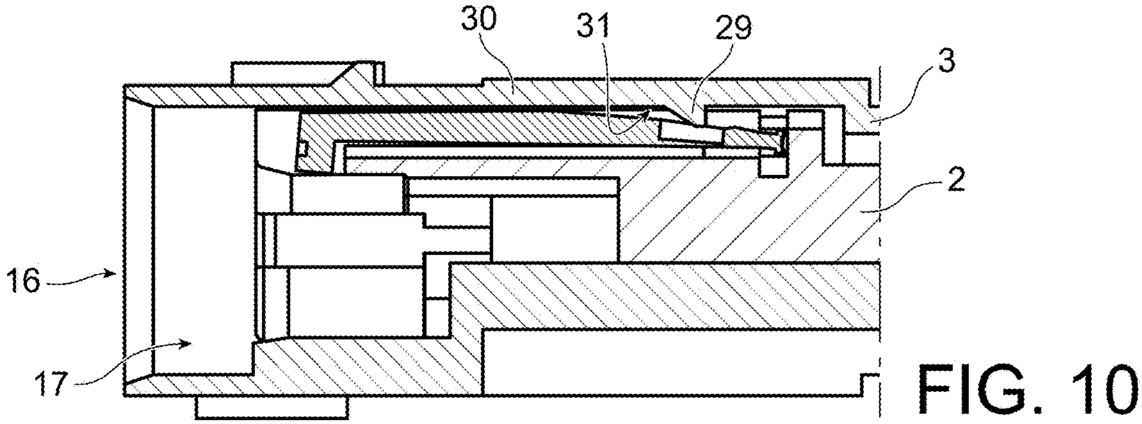
FIG. 10 is a view similar to FIGS. 5 and 8, the inner housing being in the locked position according to some embodiments.
Figure 11:
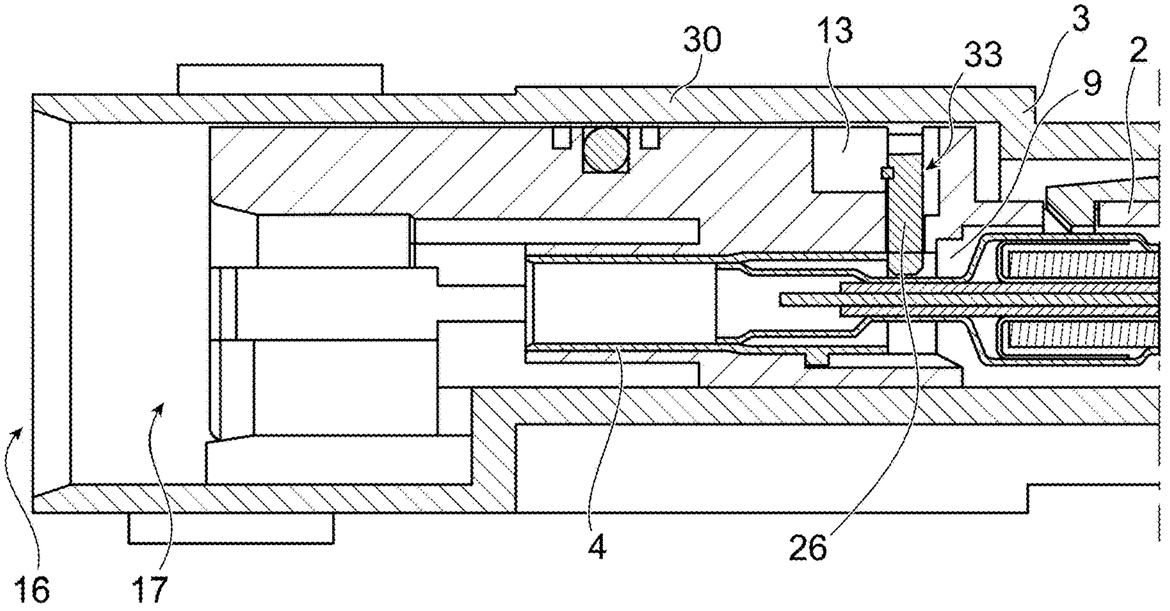
FIG. 11 is a view similar to FIG. 10, but in a different cross-section plane according to some embodiments.

The outer housing 3 has a resilient locking lance 19 terminated with a hook 20 configured to engage the rear notch 14, when the inner housing 2 is in pre-locked position, and the front notch 15, when the inner housing 2 is fully inserted, in its final and functional position, in the outer housing 3 (See FIGS. 6 and 7).

The outer housing 3 has an actuating means 29. For example, the actuating means 29 has a tooth shape. For example, the outer housing 3 has a top face 30 with an inner surface 31 from which the actuating means 29 protrudes (see FIGS. 5, 8, and 10).

Figure 3:
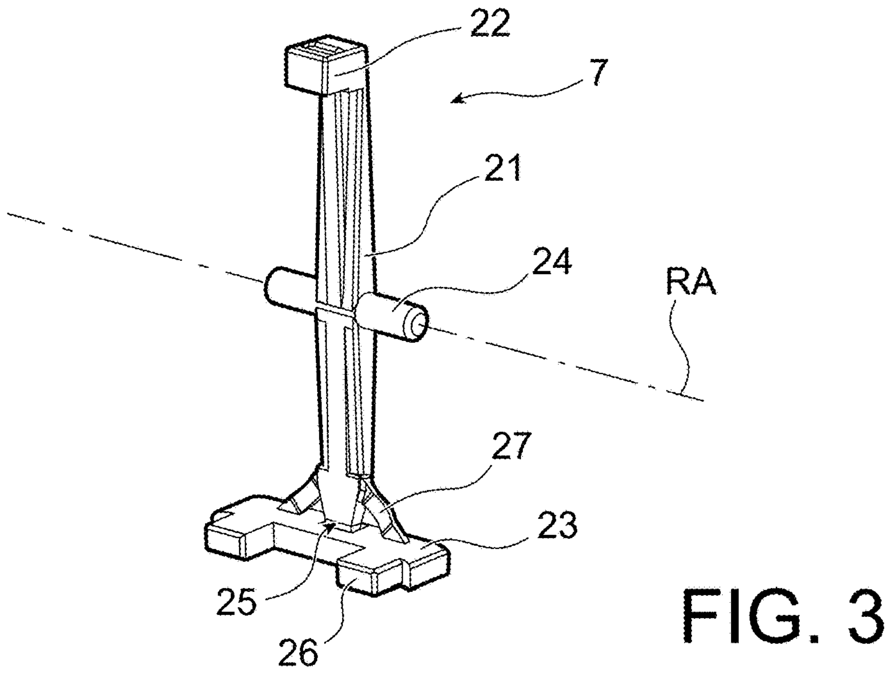
FIG. 3 is a schematic perspective view of the TPA for the connector illustrated in FIGS. 1 and 2 according to some embodiments.

As shown in FIG. 3, the TPA 7 has a longitudinal arm 21 extending between a front portion 22 and a rear portion 23. The TPA 7 has a pivot beam 24 located between the front portion 22 and the rear portion 23. The pivot beam 24 extends on either side of the arm 21, perpendicular to the arm 21. The rear portion is linked to the arm 21 by a joint 25. For example, the joint 25 is made of a free end of the arm 21 which penetrates in a hole, this free end of the arm 21 not being mechanically linked to this hole walls. In other words, the arm 21 is free to move to a certain extent in the hole. The rear portion 23 of the TPA 7 includes two latches 26 symmetrically arranged on either side of the longitudinal axis of the arm 21. Each latch 26 locks respectively a terminal 4 in its cavity 9). In addition, the TPA 7 includes two branches 27 symmetrically arranged on either side of the longitudinal axis of the arm 21. Each branch 27 connects the rear portion 23 to the arm 21. The joint 25 and the branches 27 are configured and flexible enough for allowing the latches 26 to follow a rectilinear path whereas the TPA 7 pivots around a rotation axis RA, between its open position and its closed position (and vice versa).

The TPA 7 is mounted on an upper face 28 of the inner housing 2. For example, the TPA 7 is maintained on the inner housing 2 by clipping means 35 engaging the pivot beam 24 (see FIG. 2). When the TPA 7 is mounted with the inner housing 2, the arm 21 is accommodated in the longitudinal channel 11, the pivot beam 24 is rotatably accommodated in the transversal channel 12 and each latch 26 is slidably accommodated in a respective guiding well 33 open at one side in the opening 13, and at the other side in a respective cavity 9 (see FIGS. 9 and 10). The pivot beam 24 rotates in the transversal channel 12 around the rotational axis RA. Thus, the TPA 7 is rotatably movable around the rotational axis RA, between the inner housing 2 and outer housing 3, between its open position and its closed position (and vice versa).

For assembling the connector 1, for example, each cable free end is first passed through a respective passage in the retainer 6. Then, a single wire seal 5 is mounted onto each cable 8. More particularly, for example, each cable free end is passed through a single wire seal 5. Further, a terminal 4 is crimped onto a stripped portion of each cable free end.

In addition, the TPA 7 is mounted on the upper face 28 of the inner housing 7. For example, when the TPA 7 is mounted on this upper face 28, the TPA is in open position in which the latches 26 are hold in position by indexing means 32 (see FIG. 5). For example, the indexing means 32 include, for each latch 26, a notch in the corresponding latch 26 and protrusion protruding from the inner housing 2. The indexing means 32 prevent the TPA 7 from swinging in an intermediate position which is different from the open position or the closed position.

Then, the inner housing 2 with the TPA 7 accommodated on its upper face 28 is inserted, in an insertion direction ID, into the outer housing 3, for example up to an initial position (illustrated by FIG. 5), where the rear portion 23 of the TPA 7 is located in front (relatively to the insertion direction ID) of the actuating means 29. Advantageously, as illustrated by FIG. 6, this initial position may correspond to a pre-locked position of the inner housing 2 in the outer housing 3. In this initial or pre-locked position of the inner housing 2 in the outer housing 3, the TPA is in open position. In the pre-locked position of the inner housing 2 in the outer housing 3, each hook 20 engages a respective rear notch 14 (one can note that each hook 20 is shaped to facilitate the bending of the locking lance 19, and thus the insertion of the inner housing 2 into the outer housing 3, and to prevent the inner housing 2 from being removed from the outer housing 3, when the inner housing 2 is in pre-locked or in final position in the outer housing 3).

With the inner housing 2 in pre-locked position, the free end of each cable 8 equipped with a terminal 4 and a single wire seal 5 is inserted in a respective cavity 9 of the inner housing 2 (see FIG. 6). When fully inserted in its respective cavity 9, each terminal 4 is locked by primary locking means (not shown).

Then, the inner housing 2 is further pushed into the outer housing 3, up to its final position. The locking lance 19 resiliently bends and the hook 20 reaches the front notch 15, where each hook 20 snaps back into a front notch 15. Thus, the inner housing 2 is locked in its final position (see FIG. 7).

While the inner housing 2 is further pushed into the outer housing 3, from its pre-locked position to its final position, the rear portion 23 is automatically pressed down by the actuating means 29, and thereby the TPA 7 is rotated from its open position to its closed position. The latches 26 slide down in their respective guiding well 33 (see FIGS. 8 to 11). In this position, the indexing means 32 advantageously prevent the TPA 7 from swinging to an intermediate position which does not exactly correspond to the closed position. When the TPA 7 is in closed position, each latch 26 locks a respective terminal 4, and therefore acts as secondary locking means.

Figure 13:
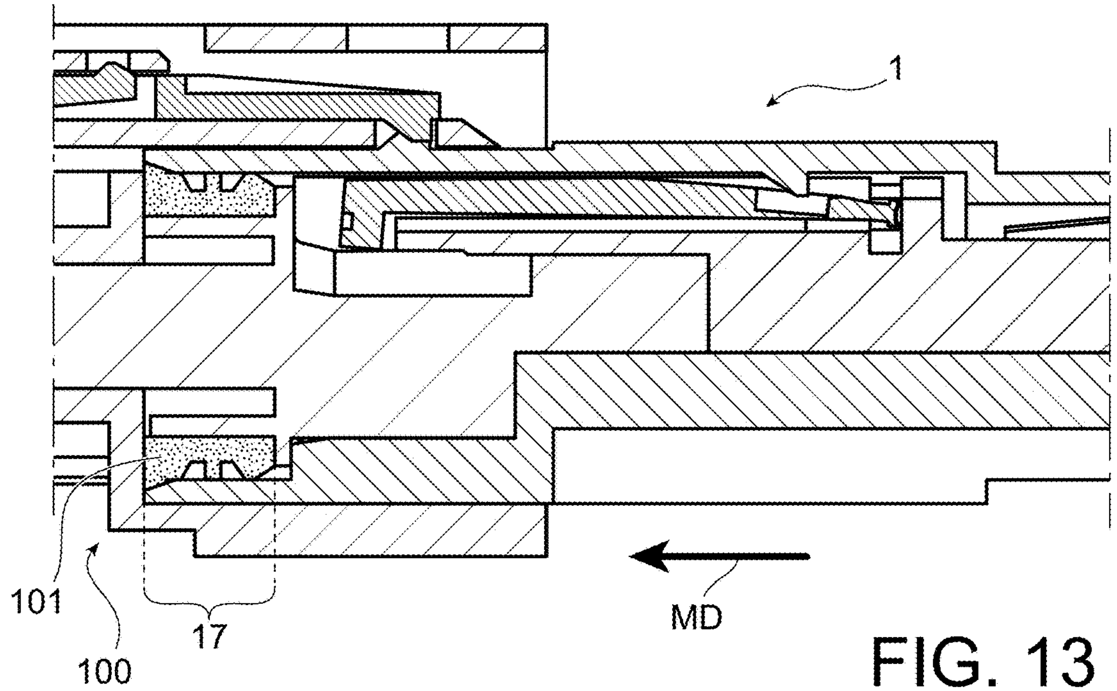
FIG. 13 is a view similar to FIG. 12, the connector and the counter-connector being fully mated according to some embodiments.

Now, the inner housing 2 is in final position and the TPA 7 is in closed position. In this embodiment, the final position of the housing 2 corresponds to the deepest functional position of the inner housing 2 in the outer housing 3. In other words, the final position of the housing 2 is the position which is suitable for a proper mating and connection of the connector 1 with the counter-connector 100. In this position, the front sealing portion 17, open on the mating face 16 of the outer housing 3 is completely cleared from both the inner housing 2 and the front portion of the TPA 7. The counter-connector 100 can be mated with the connector 1 and an interface seal 101 mounted on the counter-connector 100 can efficiently seal the mating interface between the connector 1 and the counter-connector 100, as shown in FIG. 13. On the contrary, if a terminal 4 is not fully inserted in its cavity 9, the TPA 7 cannot rotate to its closed position and its front portion interferes with the counter-connector 100 and thereby prevents the counter-connector 100 from being mated with the connector 1 (see FIG. 12).

Figure 14:
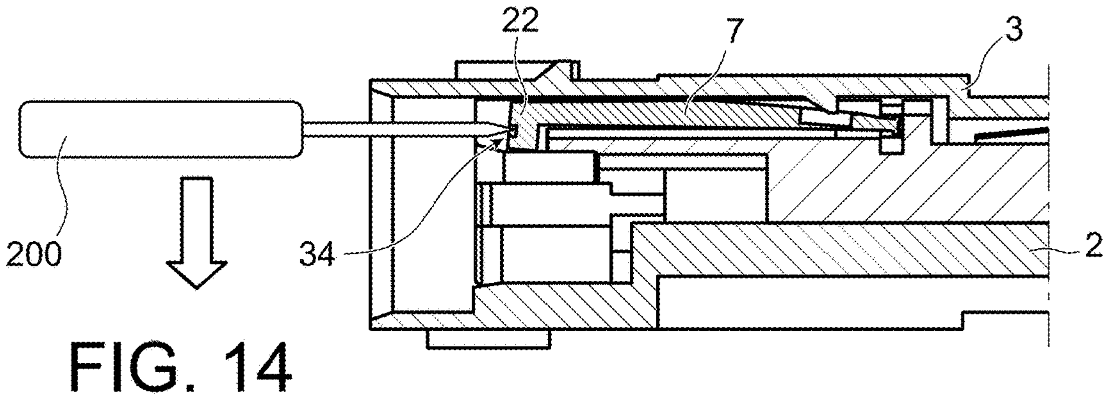
FIG. 14 is a partial schematic longitudinal and horizontal cross-sectional view of the connector of FIGS. 1 and 2, the TPA being moved from its closed position to its open position with a tool according to some embodiments.
Figure 15:
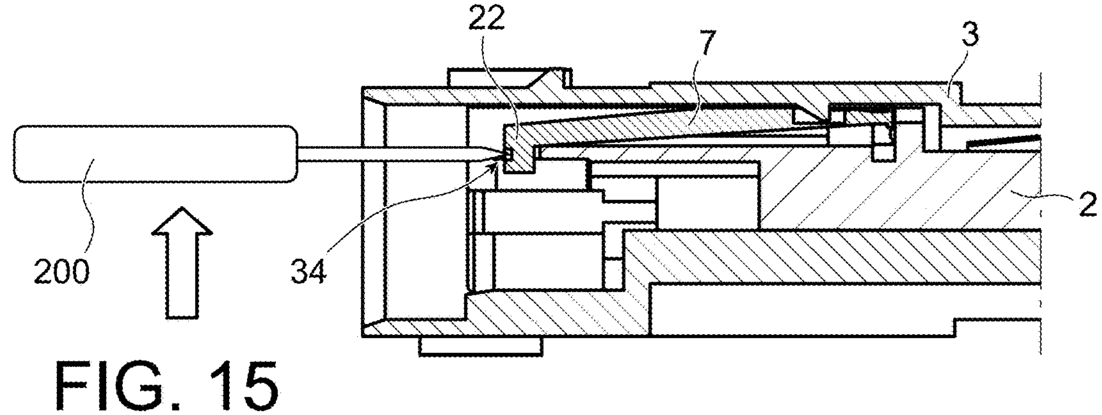
FIG. 15 is a view similar to FIG. 14, the TPA being moved from its open position to its closed position with a tool according to some embodiments.

When the counter-connector 100 and the connector 1 are unmated, the TPA 7 may remain in its closed position (see FIG. 14). Then, a tool 200 can be used to engage a groove 34 provided on the front portion 22 of the TPA 7, to push down the front portion 22 and to place the TPA 7 in open position, where the terminals 4 can be removed for maintenance for example. When, one or both terminals 4 have been replaced, the front portion 22 of the TPA 7 can be pushed upwards, in order to move the latches 26 downwards and to ensure the secondary locking function again.

The connector 1 and the assembling method disclosed above have several advantages. For example,

- the use of a tool 200 inserted in the inner 2 and outer 3 housings allows for a reduced length of the connector 1, however, the tool 200 does not need to be inserted deeply into the inner 2 and outer 3 housings.
- the front portion 22 partially protruding in the front sealing portion 17 prevents a counter-connector to be mated to the connector 1 if the terminals 4 are not well positioned in their respective cavities 9. An incorrect insertion of the terminals 4 can be easily detected by an automation actuator due to the low drive load and the possibility to predict the resistive force.

- the self-locking of the TPA 7 makes the connector 1 automation friendly (no separate TPA actuator is required).
- the TPA 7 can easily be opened and closed without removing the inner housing 2 from the outer housing 3 while replacing the terminals 4.

Discussion of Possible Embodiments

The following are non-exclusive descriptions of possible embodiments of the present invention.

In some aspects, the techniques described herein relate to an electrical connector, including an inner housing including at least one cavity extending parallel to an insertion direction, an outer housing including a mating face and being configured to accommodate the inner housing at least partially, at least one terminal, each terminal being accommodated in one of the at least one cavity, and a terminal position assurance device (TPA) configured to be mounted between the inner and outer housings, so that the TPA is completely covered by the outer housing, the TPA being configured to be rotatably moved about a rotation axis essentially perpendicular to the insertion direction, between at least an open position in which it allows the at least one terminal to be inserted in the at least one cavity and a closed position in which it locks the at least one terminal in the at least one cavity, the outer housing including actuating means configured to actuate the TPA between its open position and its closed position, when the inner housing is pushed into the outer housing between an initial position and a final position, in which the inner housing is inserted into the outer housing in its deepest functional position in the outer housing, in which the TPA is configured to be rotatably moved about the rotation axis between the open position and the closed position.

The electrical connector of the preceding paragraph can optionally include, additionally and/or alternatively any, one or more of the following features, configurations and/or additional components.

In some aspects, the techniques described herein relate to an electrical connector, wherein a front sealing portion open on the mating face of the outer housing is cleared from the inner housing when the inner housing is in final position.

In some aspects, the techniques described herein relate to an electrical connector, wherein the TPA has a front portion configured to protrude into the at least one cavity, when in the open position, and thereby prevents a functional mating of a counter-connector with the connector.

In some aspects, the techniques described herein relate to an electrical connector, wherein the TPA has a pivot beam pivoting around the rotation axis and an arm extending along a longitudinal axis between the front portion and a rear portion, the pivot beam being located between the front portion and the rear portion.

In some aspects, the techniques described herein relate to an electrical connector, wherein a joint is arranged between the rear portion and the arm.

In some aspects, the techniques described herein relate to an electrical connector, including two cavities and the rear portion of the TPA includes two latches symmetrically arranged on either side of the longitudinal axis of the arm, each latch locking respectively one of the at least one terminal in the at least one cavity.

In some aspects, the techniques described herein relate to an electrical connector, wherein the TPA includes two branches symmetrically arranged on either side of the longitudinal axis of the arm, each connecting the rear portion to the arm.

In some aspects, the techniques described herein relate to an electrical connector assembly including a connector and a counter-connector mated and electrically connected to the connector, wherein an interface seal is mounted on the counter-connector to seal the mating interface between the connector and the counter-connector, at a front sealing portion cleared from the inner housing and from the TPA when the TPA is in closed position.

In some aspects, the techniques described herein relate to an electrical connector assembly, wherein the outer housing provides a closed enclosure between the front sealing portion and a rear sealing portion configured to form a sealing barrier with a cable connected to at least one terminal.

In some aspects, the techniques described herein relate to a method of assembling an electrical connector, including providing an inner housing, an outer housing, at least one terminal, and a TPA, the outer housing including actuating means configured to actuate the TPA between its open position and its closed position, when the inner housing is pushed into the outer housing between an initial position and a final position, positioning the TPA onto the inner housing, inserting in the outer housing, the inner housing with the TPA positioned onto it, up to the initial position where the TPA is in an open position in which it allows each one of the at least one terminal to be inserted in a respective cavity, inserting each one of the at least one terminal in the inner housing, up to a full insertion position, and pushing the inner housing from the initial position to the final position, in which the inner housing is inserted into the outer housing in its deepest functional position in the outer housing, in which the TPA is in a closed position and in which the TPA locks each one of the at least one terminal in its respective cavity, in which the TPA is mounted between the inner and outer housings, the TPA being completely covered by the outer housing, and in which the TPA is configured to be rotatably moved about a rotation axis essentially perpendicular to an insertion direction, between the open position and the closed position.

In some aspects, the techniques described herein relate to a method of removing a terminal from a connector having an inner housing including at least one cavity extending parallel to an insertion direction, an outer housing including a mating face and being configured to accommodate the inner housing at least partially, at least one terminal, each terminal being accommodated in one of the at least one cavity, and a TPA configured to be mounted between the inner and outer housings, so that the TPA is completely covered by the outer housing, the TPA being configured to be rotatably moved about a rotation axis essentially perpendicular to the insertion direction, between at least an open position in which it allows the at least one terminal to be inserted in the at least one cavity and a closed position in which it locks the at least one terminal in the at least one cavity, the outer housing including actuating means configured to actuate the TPA between its open position and its closed position, when the inner housing is pushed into the outer housing between an initial position and a final position, in which the inner housing is inserted into the outer housing in its deepest functional position in the outer housing, in which the TPA is configured to be rotatably moved about the rotation axis between the open position and the closed position, the method including actuating the TPA with a tool and pivoting the TPA from its closed position to its open position around the rotation axis, thereby releasing each terminal, whereas the inner housing is inserted into the outer housing in its deepest functional position in the outer housing.

In this document, the terms “front”, “rear”, “vertical”, “upwards”, “downwards”, “upper”, “top”, etc. and derivatives thereof refer to arbitrary orientations as shown on the drawings. However, it is to be understood that various alternative orientations may be used for illustrating this disclosure.

In the drawings and in the description, same reference numbers are used for the same or similar elements.

While this invention has been described in terms of the preferred embodiments thereof, it is not intended to be so limited, but rather only to the extent assembly forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no feature limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, ‘one or more’ includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms “a”, “an” and “the” are intended to include the plural forms as well, unless the context clearly indicates otherwise. It will also be understood that the term “and/or” as used herein refers to and encompasses all possible combinations of one or more of the associated listed items. It will be further understood that the terms “includes,” “including,” “includes,” and/or “including,” when used in this specification, specify the presence of stated features, integers, steps, operations, elements, and/or components, but do not preclude the presence or addition of one or more other features, integers, steps, operations, elements, components, and/or groups thereof.

As used herein, the term “if” is, optionally, construed to mean “when” or “upon” or “in response to determining” or “in response to detecting,” depending on the context. Similarly, the phrase “if it is determined” or “if [a stated condition or event] is detected” is, optionally, construed to mean “upon determining” or “in response to determining” or “upon detecting [the stated condition or event]” or “in response to detecting [the stated condition or event],” depending on the context. Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. An electrical connector, comprising:

an inner housing comprising at least one cavity extending parallel to an insertion direction;

an outer housing comprising a mating face and being configured to accommodate the inner housing at least partially;

at least one terminal, each terminal being accommodated in one of the at least one cavity; and a terminal position assurance device (TPA) configured to be mounted between the inner and outer housings, so that the TPA is completely covered by the outer housing, the TPA being configured to be rotatably moved about a rotation axis essentially perpendicular to the insertion direction, between at least an open position in which it allows the at least one terminal to be inserted in the at least one cavity and a closed position in which it locks the at least one terminal in the at least one cavity, the outer housing comprising actuating means configured to actuate the TPA between its open position and its closed position, when the inner housing is pushed into the outer housing between an initial position and a final position, in which the inner housing is inserted into the outer housing in its deepest functional position in the outer housing, in which the TPA is configured to be rotatably moved about the rotation axis between the open position and the closed position.

2. The electrical connector according to claim 1, wherein a front sealing portion open on the mating face of the outer housing is cleared from the inner housing when the inner housing is in final position.

3. The electrical connector according to claim 1, wherein the TPA has a front portion configured to protrude into the at least one cavity, when in the open position, and thereby prevents a functional mating of a counter-connector with the connector.

4. The electrical connector according to claim 3, wherein the TPA has a pivot beam pivoting around the rotation axis and an arm extending along a longitudinal axis between the front portion and a rear portion, the pivot beam being located between the front portion and the rear portion.

5. The electrical connector according to claim 4, wherein a joint is arranged between the rear portion and the arm.

6. The electrical connector according to claim 4, comprising two cavities and the rear portion of the TPA comprises two latches symmetrically arranged on either side of the longitudinal axis of the arm, each latch locking respectively one of the at least one terminal in the at least one cavity.

7. The electrical connector according to claim 6, wherein the TPA comprises two branches symmetrically arranged on either side of the longitudinal axis of the arm, each connecting the rear portion to the arm.

8. An electrical connector assembly comprising a connector according to claim 1 and a counter-connector mated and electrically connected to the connector, wherein an interface seal is mounted on the counter-connector to seal the mating interface between the connector and the counter-connector, at a front sealing portion cleared from the inner housing and from the TPA when the TPA is in closed position.

9. The electrical connector assembly according to claim 8, wherein the outer housing provides a closed enclosure between the front sealing portion and a rear sealing portion configured to form a sealing barrier with a cable connected to at least one terminal.

10. A method of assembling an electrical connector, comprising:

providing an inner housing, an outer housing, at least one terminal, and a TPA, the outer housing comprising actuating means configured to actuate the TPA between its open position and its closed position, when the inner housing is pushed into the outer housing between an initial position and a final position;

positioning the TPA onto the inner housing;

inserting in the outer housing, the inner housing with the TPA positioned onto it, up to the initial position where the TPA is in an open position in which it allows each one of the at least one terminal to be inserted in a respective cavity;

inserting each one of the at least one terminal in the inner housing, up to a full insertion position; and pushing the inner housing from the initial position to the final position, in which the inner housing is inserted into the outer housing in its deepest functional position in the outer housing, in which the TPA is in a closed position and in which the TPA locks each one of the at least one terminal in its respective cavity, in which the TPA is mounted between the inner and outer housings, the TPA being completely covered by the outer housing, and in which the TPA is configured to be rotatably moved about a rotation axis essentially perpendicular to an insertion direction, between the open position and the closed position.

11. A method of removing a terminal from a connector having an inner housing comprising at least one cavity extending parallel to an insertion direction, an outer housing comprising a mating face and being configured to accommodate the inner housing at least partially, at least one terminal, each terminal being accommodated in one of the at least one cavity; and a TPA configured to be mounted between the inner and outer housings, so that the TPA is completely covered by the outer housing, the TPA being configured to be rotatably moved about a rotation axis essentially perpendicular to the insertion direction, between at least an open position in which it allows the at least one terminal to be inserted in the at least one cavity and a closed position in which it locks the at least one terminal in the at least one cavity, the outer housing comprising actuating means configured to actuate the TPA between its open position and its closed position, when the inner housing is pushed into the outer housing between an initial position and a final position, in which the inner housing is inserted into the outer housing in its deepest functional position in the outer housing, in which the TPA is configured to be rotatably moved about the rotation axis between the open position and the closed position, the method comprising:

actuating the TPA with a tool and pivoting the TPA from its closed position to its open position around the rotation axis, thereby releasing each terminal, whereas the inner housing is inserted into the outer housing in its deepest functional position in the outer housing.

* * * * *